J. McCARTIN.
THERMOSTAT CONTROLLER.
APPLICATION FILED JAN. 29, 1909.
924,095.
Patented June 8, 1909.
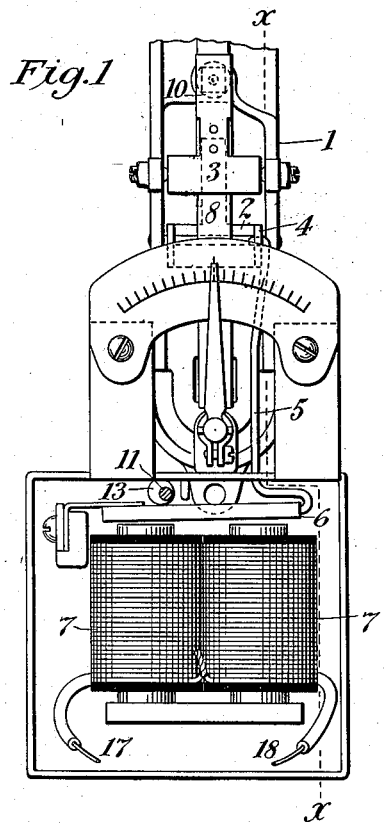
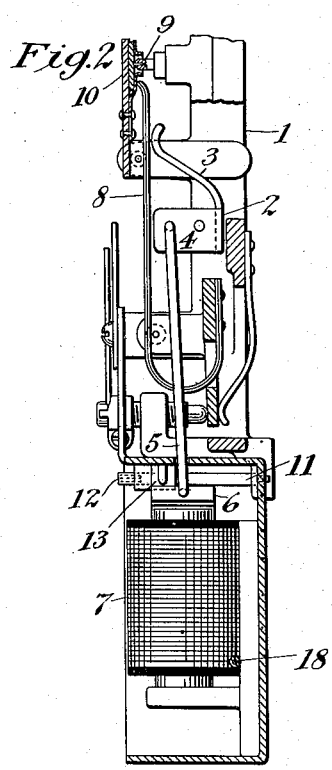
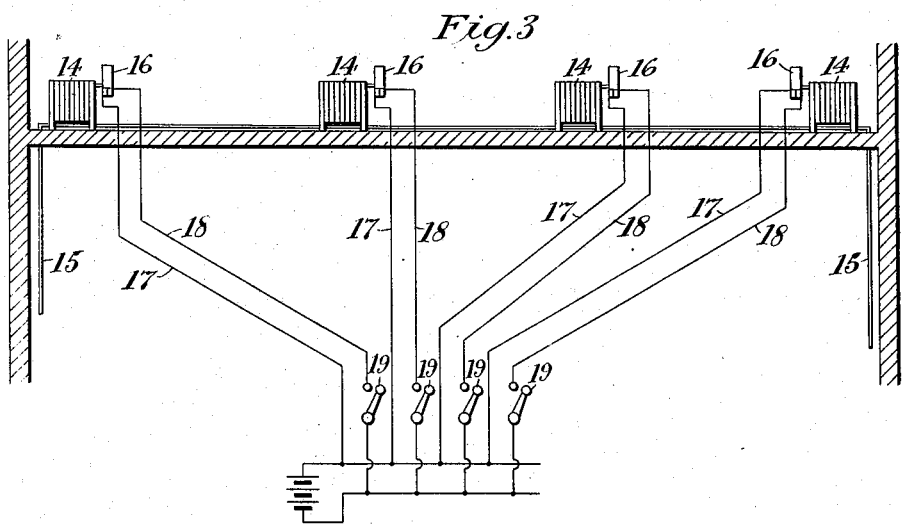
Witnesses:
Howard M. Rowe
William H. Mohr
Inventor
James McCartin
By his Attorney
Andrew Wilson

UNITED STATES PATENT OFFICE.

JAMES McCARTIN, OF BROOKLYN, NEW YORK.

THERMOSTAT-CONTROLLER.

No. 924,095.

Specification of Letters Patent.

Patented June 8, 1909.

Application filed January 29, 1909. Serial No. 474,998.

*To all whom it may concern:*

Be it known that I, JAMES MCCARTIN, a citizen of the United States and of the State of New York, and residing in the borough of Brooklyn, county of Kings, New York, have invented certain new and useful Improvements in Thermostat-Controllers, of which the following is a specification.

My invention relates to means for restraining or controlling the action of the sensitive, compound metallic bar of thermostats, and consists in the particulars hereinafter set forth and claimed.

In the drawings Figure 1 is a front view of the lower portion of a thermostat with my controller attached; Fig. 2 is a sectional side view of the same taken on the line X—X of Fig. 1, and Fig. 3 illustrates diagrammatically a method of controlling from a central space a number of thermostats applied to the units of a steam heating system.

In the frame 1 of a thermostat I pivot a crosshead 2 provided with a controlling arm 3 (shown in broken lines in Fig. 1) and with a lever arm 4, connected by a rod 5 with the armature 6 of the electro magnets 7 7. The upper end of the controlling arm 3 rests normally free of the sensitive, compound bar 8; and the parts are so adjusted that when the armature is drawn down against the magnets the lever arm is depressed by the rod 5, and the controlling arm 3 is pressed against the sensitive bar 8 so as to flex or hold it outward and thereby free the air channel 9 of the thermostat from the control of the valve cap 10, permitting the pneumatically actuated portion of the thermostat to operate in the well known manner so as to control the apparatus to which it is attached.

The shaft 11 is journaled above the armature 6 and is provided with a suitable key seat 12 therein, and carries a cam 13 which rests on top of the armature 6; and by turning the shaft 11 to the left the cam will force the armature 6 down, producing the same movement in the controlling arm as though the armature was drawn down by the coils 7 7.

In Fig. 3 I have shown a number of steam heating units 14 14, attached to a common source of supply 15 15, and each provided with a thermostat, indicated by 16 16, equipped with one of my improved controllers, the wires 17, 18, of the electro magnets 7 7 being shown as governed by suitable switches 19 19 at a central station. And it will be seen that by closing either of the circuits by means of its switch 19, the armature 6 will be drawn down, preventing the thermostatic bar from controlling the pneumatic apparatus as already described.

As is well understood in the art, it is a common practice to equip the radiators of heating systems with thermostats which automatically govern the flow of the heating fluid through the radiators, by restricting the flow when the temperature rises and increasing it when the temperature diminishes, so as to maintain an approximately uniform temperature. And, to avoid meddling or improper interference with the system no hand valves are provided for the individual radiators, and to arbitrarily shut off any particular radiators a whole section of the system will have to be cut out. But by the use of my improvements, all the units of the system are placed under direct control from a central point and may be thrown out of or into operation by simply closing or opening the switches governing their respective thermostats. And besides this the units may be locked out of position by means of the cam lock as heretofore described.

It will be understood that the details of the apparatus may be modified without departing from the spirit of my invention, and that the method of wiring may be varied by using any well known system whereby the units may be controlled from a central station.

Having thus described my invention, what I claim and desire to secure by Letters Patent of the United States is:—

1. The combination, with a thermostat provided with a thermally sensitive member, of means actuated through an independent electrical circuit for temporarily suspending and for bringing again into operation the control of such sensitive member over the thermostat.

2. The combination, with a thermostat provided with a thermally sensitive member consisting of a compound metallic bar, of an arm adapted to engage with the free end of such metallic bar, and means for pressing such arm against such bar to hold it out of operative control of the thermostat.

3. The combination, with a thermostat, provided with a thermally sensitive member consisting of a compound metallic bar, of a pivoted arm adapted to engage with the free end of such metallic bar, and means for pressing such arm against such bar to hold it out of operative control of the thermostat.

4. The combination, with a thermostat, provided with a thermally sensitive member consisting of a compound metallic bar, of an arm adapted to engage with the free end of such metallic bar, and electrically operated means for pressing such arm against such bar to hold it out of operative control of the thermostat.

5. The combination, with a thermostat provided with a thermally sensitive member consisting of a compound metallic bar, of a movable member adapted to engage with the free end of such bar, and means, operated by an electric magnet, for pressing such movable member against such bar.

6. The combination, with a thermostat provided with a thermally sensitive member consisting of a compound metallic bar, of a movable member adapted to engage with the free end of such bar, means connected with an armature for pressing such movable member against such bar, electric magnets for moving said armature, and supplementary means consisting of a rotary shaft provided with a cam, for moving said armature.

7. The combination, with a system of apparatus embodying units each governed by a thermostat provided with a thermically sensitive member and electrically actuated controlling means for temporarily suspending and for bringing again into operation the influence of such sensitive member over the thermostat, of an electrically operated system connected with all of said controlling means whereby either may be actuated, so as to suspend the thermostatic influence over its apparatus unit, without affecting the others.

8. The combination, with a system of apparatus embodying units each governed by a thermostat provided with a thermically sensitive member and electrically actuated controlling means for temporarily suspending and for bringing again into operation the influence of said sensitive member over the thermostat, of an electrical system, operated from a central point, connected with all of said controlling means whereby either may be actuated, so as to suspend the thermostatic influence over its apparatus unit, without affecting the others.

9. The combination with a heating system, embodying a plurality of units, connected with a common source of supply, each governed by a thermostat provided with a thermically sensitive member and electrically actuated controlling means for temporarily suspending and for bringing again into operation the influence of such sensitive member over the thermostat, of an electrically operated system connected with all of said controlling means whereby either may be actuated, so as to suspend the thermostatic influence over its apparatus unit, without affecting the others.

JAMES McCARTIN.

Witnesses:
WILLIAM H. MOHR,
HOWARD M. ROWE.